No. 708,279. Patented Sept. 2, 1902.
S. WATERMAN.
SELF IGNITER.
(Application filed Feb. 6, 1902.)
(No Model.)
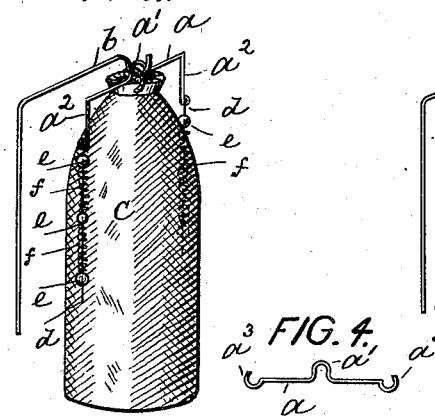
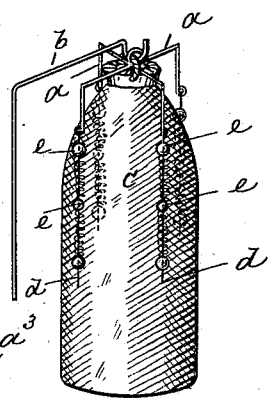
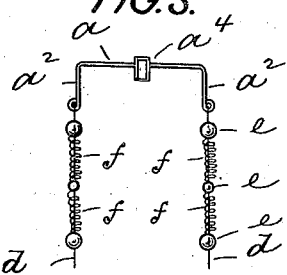
Witnesses:
Arthur Lumpus;
William Schulz.
Inventor
Sarah Waterman
per Roeder & Briesen
Attorneys
THE NORRIS PETERS CO., PHOTO-LITHO., WASHINGTON, D. C.

UNITED STATES PATENT OFFICE.

SARAH WATERMAN, OF NEW YORK, N. Y.

SELF-IGNITER.

SPECIFICATION forming part of Letters Patent No. 708,279, dated September 2, 1902.

Application filed February 6, 1902. Serial No. 92,775. (No model.)

*To all whom it may concern:*

Be it known that I, SARAH WATERMAN, a citizen of the United States, and a resident of New York city, county and State of New York, have invented certain new and useful Improvements in Self-Igniters, of which the following is a specification.

This invention relates to a self-igniter which insures a quick ignition of the gas when the gas-cock is opened. The igniter may be readily fitted to the suspending-hook of the mantle and may readily be removed and replaced when worn.

In the accompanying drawings, Figure 1 is a perspective view of my improved igniter, showing it applied to a mantle. Fig. 2 is a perspective view of a modification; Fig. 3, a side view of a further modification of the igniter, and Fig. 4 a side view of a modification of the bail.

The letter $a$ represents a bail or cross-arm which is adapted to be suspended from the hook $b$, carrying the mantle $c$, so that the bail extends horizontally across the top of the mantle. The bail is provided at its center with a loop $a'$ in order to engage the hook and is of a length to project with its ends a short distance beyond the mantle. These ends may be either bent downward, as at $a^2$, Fig. 1, or they may be looped, as at $a^3$, Fig. 4. From each end of the bail depends a platinum wire $d$, carrying a number of spaced igniting-pellets $e$ of the class which become red-hot when brought into contact with illuminating-gas. Between the pellets $e$ each wire $d$ is encircled by a platinum spiral $f$, extending from pellet to pellet. Thus the wire $d$ constitutes a carrier for the pellets and at the same time a core for the intervening spirals, so that the latter are held against displacement.

It will be seen that the platinum wires and spirals, as well as the pellets, are arranged along both sides of the mantle and in close proximity thereto. The gas on being turned on will glow the pellets, and the latter will in turn render the platinum wire and the coil incandescent, so as to ignite the gas quickly. If the igniter becomes worn, it may be readily lifted off the hook and replaced.

In Fig. 2 I have shown a cruciform bail $a$ $a$ with four platinum wires in lieu of the single bail shown in Fig. 1.

In Fig. 3 the suspending-loop $a'$ is replaced by a socket $a^4$, that is projected over the end of hook $b$.

What I claim is—

A self-igniter composed of a bail, platinum wires depending from the bail ends, a number of spaced igniting-pellets carried by the platinum wires, and platinum spirals that encircle the wires intermediate the pellets and extend from pellet to pellet, substantially as specified.

Signed by me at New York city, county and State of New York, this 5th day of February, 1902.

SARAH WATERMAN.

Witnesses:
 F. V. BRIESEN,
 WILLIAM SCHULZ.